(12) United States Patent
Lindberg (10) Patent No.: US 7,412,623 B1
(45) Date of Patent: Aug. 12, 2008

(54) STATE MACHINE SIMULATOR FOR TESTING COMPUTER SYSTEMS

(75) Inventor: John A. Lindberg, Worth, IL (US)

(73) Assignee: Sun Microsystems, Inc., Santa Clara, CA (US)

( * ) Notice: Subject to any disclaimer, the term of this patent is extended or adjusted under 35 U.S.C. 154(b) by 631 days.

(21) Appl. No.: 11/151,078

(22) Filed: Jun. 13, 2005

(51) Int. Cl.
*G06F 11/00* (2006.01)

(52) U.S. Cl. .......................... 714/33; 717/124; 717/128

(58) Field of Classification Search .................... 714/33, 714/37, 38, 48; 717/120, 121, 124, 127, 717/128, 152, 153
See application file for complete search history.

(56) References Cited

U.S. PATENT DOCUMENTS

| | | | |
|---|---|---|---|
| 5,812,780 A * | 9/1998 | Chen et al. .................. 709/224 |
| 6,944,848 B2 * | 9/2005 | Hartman et al. ............. 717/124 |
| 7,058,843 B2 * | 6/2006 | Wolf .............................. 714/4 |
| 7,310,798 B1 * | 12/2007 | Gunara et al. ............... 717/135 |
| 2002/0177977 A1 | 11/2002 | Scarlat et al. |
| 2003/0069957 A1 | 4/2003 | Malmskog et al. |
| 2003/0139919 A1 * | 7/2003 | Sher et al. ..................... 703/25 |
| 2003/0151619 A1 | 8/2003 | McBride |
| 2003/0182408 A1 | 9/2003 | Hu |
| 2004/0030747 A1 | 2/2004 | Oppermann |
| 2004/0220792 A1 * | 11/2004 | Gallanis et al. ............... 703/13 |

* cited by examiner

*Primary Examiner*—Nadeem Iqbal
(74) *Attorney, Agent, or Firm*—William J. Kubida; Michael C. Martensen; Hogan & Hartson LLP (57) ABSTRACT

A method for simulating running a software application having a plurality of processes on a computer system being tested. The method includes providing a number of work daemons on the test system, with the number being chosen to be substantially equal to the number of processes in the simulated software application. The method continues with configuring each of the work daemons with a static portion that performs functions on or exercises memory of the test system when the work daemon is run. Each of the work daemons is also configured with a dynamic portion including text segments that are selectively executable when the work daemon is run. The static and dynamic portions simulate operations performed by a corresponding one of the modeled software application processes. The method includes running at least a portion of the configured work daemons on the test system and monitoring performance of the test system.

20 Claims, 10 Drawing Sheets

STATE MACHINE SIMULATOR FOR TESTING COMPUTER SYSTEMS

BACKGROUND OF THE INVENTION

1. Field of the Invention

The present invention relates, in general, to testing computer hardware such as part of a quality assurance process, and, more particularly, to a method and corresponding system for testing and analyzing a computer device or network of devices during running of one or more software applications by simulating loads, e.g., memory, communication, and processing loads, created by applications intended to be run on the tested device or network or devices.

2. Relevant Background

Within the computer industry, an ongoing problem is providing adequate testing and quality assurance of computer devices, systems, and networks prior to initial use and installation by customers. As with other consumer products, it is typically desirable to run a new product or product configuration through a battery of tests to insure that the product performs as expected without performance degradation or without serious problems or errors. With new computer devices, this can be a relatively simple task when testing a standalone computing device such as a personal computer, but testing and quality assurance tasks quickly become very complicated and difficult when applied to large computer devices or systems of networked devices.

Customers in the computer industry often run very sophisticated and large suites of applications to perform their data processing and communicating operations. For example, in the telecommunications industry, telephony customers or businesses that manage the infrastructure for a cellular network have applications that control and manage large numbers of cellular or wireless calls on an ongoing basis. Telephony switching and/or call processing applications generate huge processing, memory, and communication loads within a computer system that far exceeds relational database applications (e.g., another example of applications that can place large loads on computer systems). During operation of such large applications, huge amounts of binary text segments that represent compiled code are executed, memory is accessed, and both inter and intra process communications take place between systems on a particular computing network. Developers and manufacturers often create computer devices and systems to meet the demands of particular customers and as a result, there is a need for being able to test the newly created computer devices and systems under the load or operating conditions for which they are being designed, i.e., under the load conditions their customers will place the machines by running their particular applications and processing their business-specific data.

One useful technique for testing a computer system or network of computer devices is to install the system or network of devices on the customer's premises, such as in an onsite customer-controlled laboratory. In such a setting, the customer makes available their programs or applications and the system or network of devices can be configured to process customer data to provide an accurate and realistic test under the operating conditions intended for the computer system. In this manner, the application(s) or program(s) specific characteristics, such as spatial and execution characteristics, can be tested during operation of the computer system to determine how these effect performance. For example, theoretical performance gains for new computer systems or devices are often much higher than what is actually experienced when the new computer systems or devices are installed on a customer's site to run their applications, e.g., increases in processor clock speed that would tend to indicate a particular increase in performance may not necessarily provide such an improvement due to the particular spatial and execution characteristics of the customer's applications.

Testing of a computer system or network of computer devices can be accomplished effectively with the assistance of the customer, which may include installing equipment on their facilities. However, such testing is often difficult to arrange and schedule and can quickly become a bottleneck when testing indicates problems that may need iterative testing to correct problems. To date, the computer industry has not been able to provide adequate quality assurance and testing of a computer system or its configuration without having the customer's application itself and, in some cases, the customer's data flow. Attempts to run the actual application have not proven successful or have been determined too costly as it is very difficult and time consuming to write programs of the size required to emulate complex customer software suites, e.g., software applications that include or generate millions of lines of code that result in binary text segments that are proportionally large to the amount of compiled code.

Hence, there remains a need for a method and system for testing computer devices and systems under conditions, e.g., spatial and execution characteristics, similar to those created by a particular set of applications or programs to be implemented by an intended customer or end user. Preferably, such a method and system would enable the computer industry to design and build machines to run particular applications before an application(s) is available or without requiring use of the actual application(s).

SUMMARY OF THE INVENTION

The present invention addresses the above and other problems by providing a method and corresponding systems for testing one or more computer devices or a computer system under operating conditions including a simulated load anticipated to be created by one or more applications, e.g., an end user's suite of software applications. The inventive method and system provides a portable framework that models the running suite of applications with a complex finite state machine (or state machine simulator that receives inputs, records data for some period of time, and provides outputs) that generates the same or a similar set of resource demands as the modeled suite of software applications.

For example, the method and system of the invention are useful for creating a synthetic load for modeling the important characteristics of a particular application, such as a set of call processing applications or other large, complex suite of applications. The method and system in some cases is schema configurable (such as by setting parameters of a work daemon configuration file (WDCF) and a load generation configuration file (LGCF) that are used to define the static and dynamic models for the targeted application(s)) so that code would not have to rewritten for differing simulations or loads. The method and systems of the invention is adapted to generate a selectable number of arbitrarily sized text segments and to execute the text segments with precise control. This eliminates the need for writing thousand or millions of lines of code to generate and exercise a very large text segment to analyze operation of a computer system and its components during its use for running a particular application or suite of applications, e.g., for exercising components such as the cache of the system in addition to testing processor operations. The invention can be thought of as providing a configurable load generator that generates a consistent, reproducible load to exercise a computer system components including, but not limited to, the communication network, internal communication channels (such as inter process communication channels or IPC), heap and stack memory, shared memory, and text execution as would be done by a finite state machine. Hence, the invention allows performance analysis of system resources used by a complex application or suite of applications (such as a call processing application(s)) that would be difficult to recreate outside the customer's or end user's environment.

More particularly, a method is provided for simulating running a software application having a plurality of processes on a computer system being tested. The method includes providing a number of work daemons on the test system, with the number being chosen to be substantially equal to the number of processes in the simulated software application. The method continues with configuring each of the work daemons with a static portion that performs function on or exercises memory of the test system when the work daemon is run. Each of the work daemons is also configured with a dynamic portion including text segments that are selectively executable when the work daemon is run. Preferably, the static and dynamic portions are adapted to simulate operations performed by the corresponding process of the modeled software application. The method then continues with running at least a portion of the configured work daemons on the test system and monitoring performance of the test system.

The configuring of the work daemons with the static portion comprises parsing static configuration parameters from a record in a work daemon configuration file and generating a machine language source code file based on the parsed parameters. The configuring of the work daemons with the dynamic portion is one of the important features of the invention and includes reading an insertion set of machine language code from a source file, retrieving an insertion value, and inserting a number of copies of the read insertion set of code into the previously generated machine language source code file, with the number of inserted or padded copies being equal to the retrieved insertion value (which allows a work daemon to be quickly and effectively sized to simulate a process in the modeled application without forcing a developer to write many lines of code. To provide the dynamic portion, the method includes retrieving an insertion index and then inserting the copies of the read code into the previously generated machine language source code at the located insertion point or index, which allows the code to not only be selectively sized but also to be addressable for selective execution.

In this regard, the method may include the work daemons receiving a work directive from a load generation client and in response, performing a set of data segment directives with the static portion (e.g., exercising or manipulating cache, stack, heap, and/or shared memory in the test system) and a set of text segment directives with the dynamic portion of the work daemon. The load generation may be achieved by each of the load generation clients reading a load generator configuration file, transmitting records from the file to specified ones of the work daemons, and receiving and logging responses from the work daemons. A cycle count may be provided to indicate how many times the set of records should be sent to the work daemons. The method typically further includes providing a communication daemon in the test system to receive the work directive records, to process the work directive records, to identify the addressed one of the work daemons, and to transmit the work directives to the addressed work daemons over an internal communication channel or IPC. The communication daemon also receives the responses or acknowledgements from the work daemons and returns these to the appropriate work generation client for logging (at least in the networked implementation).

DETAILED DESCRIPTION OF THE PREFERRED EMBODIMENTS

The invention is directed toward a method and system for providing a state machine simulator for testing computer systems by modeling operating conditions for one or more selected applications. As will become clear from the following description, the method and system is flexible and easily configurable via schema files (e.g., the WDCF and LGCF). The method models an actual application by providing processes (or work daemons) that are the same or similar in number, size, priority, and the like as the modeled application. A load generator is used to generate a load via communication paths similar to that used in practice such as over an external communications network and over internal communication paths or channels (e.g., via IPC), which more accurately models operating conditions that will be experienced by a computer system or device and/or network by modeling possible communication path latencies. The method and system allow flexibility in specifying the amount of work performed by each simulated process (or generated work daemon) with work generation messages generated and transmitted by one or more load generators over a network and internal communication channels. Response messages are generated when specified from the simulated processes or work daemons providing the ability to log responses on the target machine or client running the load generators for later analysis, such as high resolution, latency measurements. Testing or performance instrumentation, such as those provided with many operating systems, may be utilized to monitor operating parameters or characteristics of the tested machine such as processor occupancy, processor cache statistics, OS loading, disk I/O activity, network activity, and the like.

Figure 1:
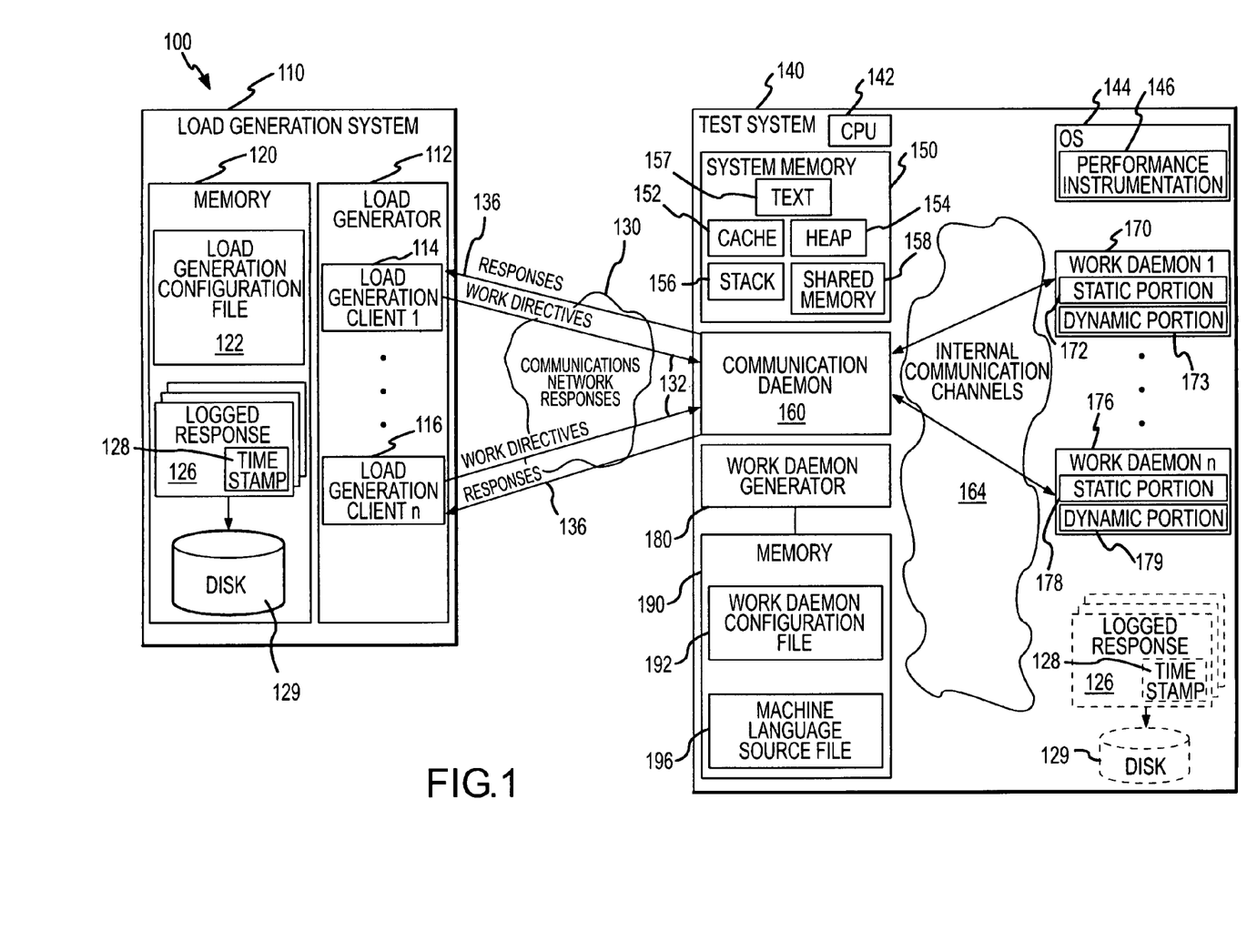
FIG. 1 illustrates in block form a state machine simulator system according to the present invention adapted for operating a test system or system being tested under load and operating conditions of a modeled application(s)

In the following discussion, computer and network devices, such as the software and hardware devices within the system 100 including the load generation system 110 and test system 140, are described in relation to their function rather than as being limited to particular electronic devices and computer architectures and programming languages. To practice the invention, the computer and network devices or elements may be any devices useful for providing the described functions and that it is desired to test or evaluate as part of a load simulation process, including well-known data processing and communication devices and systems, such as application, database, web, blade, and entry level servers, midframe, midrange, and high-end servers, personal computers and computing devices including mobile computing and electronic devices with processing, memory, and input/output components running code or programs ("applications", "tasks" within such applications, and "services") in any useful programming language, and server devices configured to maintain and then transmit digital data over a wired or wireless communications network.

Figure 2:
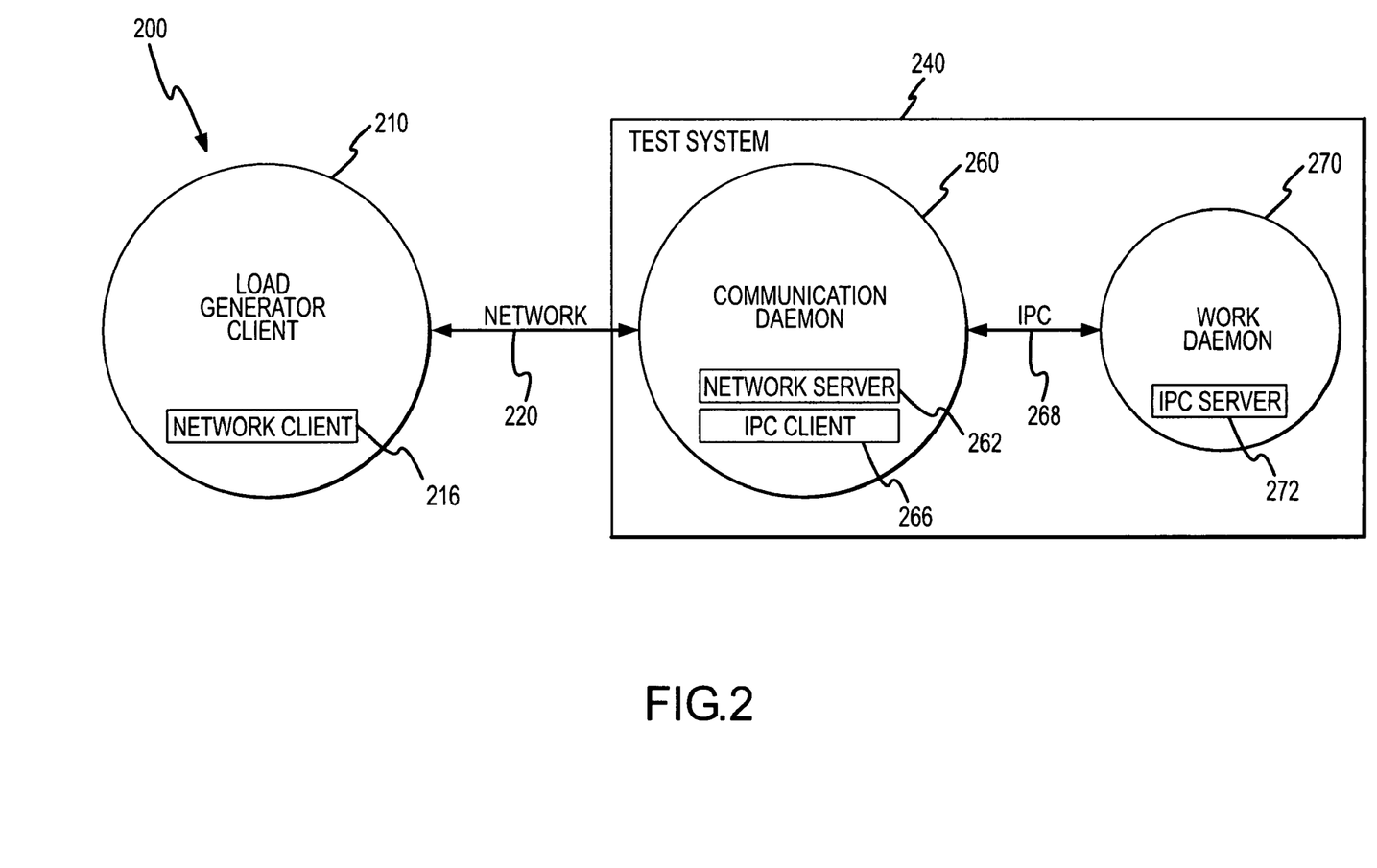
FIG. 2 is a more simplified block diagram of a simulator system useful for describing the communications of several of the components of the system that provide the load generation, communication, and work/processing functions of the system.

Similarly, data storage systems and memory components are described herein generally and are intended to refer to nearly any device and media useful for storing digital data such as disk-based devices, their controllers or control systems, and any associated software. Data, including transmissions to and from the elements of the systems 100, 200 and among other components of the network/systems 100, 200, typically is communicated in digital format following standard communication and transfer protocols, such as UDP, TCP/IP, HTTP, HTTPS, FTP, and the like, or IP or non-IP wireless communication protocols. The invention is particularly suited for controlling data flow and use or processing by one or more applications on a test machine or system 140 that communicates with a plurality of clients (or load generation clients 114, 116) over a communications network. However, the concepts of the invention are readily applicable to any computer system with services or applications running in a distributed or network environment or for evaluating a single computer system 140 that communicates with internal clients and processes (e.g., the load generation system 110 may be provided as part of the test system 140 rather than being a separate machine communicating over a communications network 130).

FIG. 1 illustrates a state machine simulator system 100 that is adapted according to one embodiment of the invention for effectively modeling a particular application or applications (e.g., a customer's application, an end user's application, or the like for a new computer system or machine such as test system 140). The system 100 is particularly suited for modeling caching and spatial execution characteristics of an application within a system that is being tested. As will be described in detail, one unique feature of the system 100 is its ability to build large text segments to more accurately model or simulate processes within a modeled application (e.g., with work daemons 170, 176 that are sized by adding a selected number of text segments representing executing or compiled code lines of the applications processes).

As shown, the system 100 includes a load generation system 110 that communicates over a communications network 130 with a test system or system being tested 140. Three of the more important features of the system 100 are the load generator 112 which includes one to any selected number of load generation clients 114, 116 for simulating a load, one or more work daemons 170, 176 that operate to simulate the processes of a modeled or end user's application (not shown), and a communication daemon 160 for managing communication between the load generation clients 114, 116 and the work daemons 170, 176. Each of these components of system 100 is explained in detail with reference to FIGS. 2-10. Briefly, these components work in conjunction to allow the system 100 to model processes and traffic of a select end user's application (the simulated application) by imitating for each of the modeled processes in system 140 the use of text segments (i.e., static instructions for the process) and data (e.g., data interacted with by the process to exercise or manipulate system 140 memory in the form of heap, stack, cache, and shared memory). As will be appreciated by those skilled in the art, the system 100 is not only effective at modeling the data characteristics of a modeled application but also at modeling the applications text segments in a manner that creates like-sized work daemons 170, 176 that are readily controllable.

Referring to FIG. 1, the load generation system 110 is shown to include a load generator 112 that functions to generate the load placed on the test system 140. To this end, the load generator 112 includes an arbitrary number of load generation clients 114, 116 (i.e., ranging in number from zero when no load is applied to some arbitrary number "n" to provide a desired number of clients to generate a desired load). The use of a plurality of clients 114, 116 rather than a single client is often a more accurate representation of load during operation of a modeled application but one client may be used when appropriate.

During operation of the load generation system 110, the load generator 112 instantiates a number of load generation clients 114, 116 that utilize a load generation configuration file 122 to generate a load that is applied to the test system. The load generation clients 114, 116 are typically called with a specification of the communication protocol (e.g., TCP or UDP or the like), of the test system 140 (such as host name (or IP network address 130 and port). The LGCF 122 supports load generation to retrieve all files and then to send or "play" records to the work daemons 170, 176, of a number of cycles defining the number of times to cycle through or repeat the LGCF (e.g., if 5 cycles are specified and there are 20,000 records (or work directives) in the LGCF the number of work directives sent by the load generation client becomes 100, 000), and optionally, of a file 126 to log responses 136 from the work daemons 170, 176.

The LGCF 122 may take a variety of forms to practice the invention. In one embodiment, the LGCF 122 is arranged in record format with each record having thirteen fields. One field is provided as a work daemon selector that defines which work daemon 170, 176 to transmit the work directive to (such as by providing an internal communication channel 164 corresponding to the work daemon 170, 176). A number of fields are provided to define the work directive. Two fields are used to specify which text segment to jump to (i.e., where to jump) in the work daemon 170, 176 and how much to execute. Two other fields are used to specify data segment read offset (i.e., go to a specified offset) and a read length (i.e., read this length). Two other fields are used to specify a data segment write offset (i.e., go to the specified offset) and write length (i.e., write this amount of data). Similarly, four fields are used to define read offset, read length, write offset, and write length for shared memory. In other words, each LGCF record can be thought of as containing five work directives or a work directive having five parts that direct a work daemon 170, 176 to read/write to heap memory or to shared memory and to process text segments based on function index that allows you to go to a location in a text segment and execute a portion of text (i.e., execute text segment). Another field is used to define the number of acknowledgments or response to be sent from the work daemon 170, 176, and these responses are used for better simulating network traffic and traffic within the test system 140. A final field may be provided to define a post send delay to control realism or spread of the work generation. This field is processed by the load generation client 114, 116 to specify how much delay it should place between transmission delay between LGCF records or work directives 132.

During operation, each load generation client 114, 116 transmits load generation messages (including work directive fields) or work directives 132 to the test system 140 and more accurately, to a particular work daemon 170, 176 over communications network 130 (e.g., using network protocols such as UDP or TCP or the like) via a communication daemon 160. The work directives 132 are processed by the work daemons 170, 176 to cause the work daemons 170, 176 to perform certain functions or work and when appropriate, the work daemons 170, 176 transmit back acknowledgements or responses 136 via communication daemon 160 and communications network 130. The load generator 112 (or another logging/monitoring tool not shown) acts to store the responses 136 as logged responses 126 in memory 120 and typically, are later stored to disk 129. For analysis purposes, the responses 126 may each include time stamps 128 included by the work daemons 170, 176. For example, time stamps 128 can be used to determine the total round trip time from transmission of work directives 132 to receipt of responses 136, the time spent by work daemons 170, 176 performing work directives 132, and the round trip IPC time between the communication daemon 160 and the work daemons 170, 176. Optionally, the logged responses 126 with time stamps 128 may be collected in test system 140 and later dumped or stored to disk 129 (shown as optional with dashed lines but using the same identification numbers for items that perform like functions).

The system 100 further includes a test system 140, which is intended to represent any computer component or components that may be tested for quality assurance purposes to determine performance characteristics during running of a particular application (i.e., the modeled user's application(s)) under a particular load (i.e., the load generated by the load generation system 110). As such, the system 140 includes CPU 142 running operating system 144, which is shown having performance instrumentation 146 that functions to capture performance parameters for the test system 140 during testing or simulation operations. The system 140 further includes system memory 150 that is shown to include cache 152, heap 154, stack 156, text 157, and shared memory 158 each of which may be exercised during operation of the system 100 to better simulate operating conditions during the running of an application simulated by work daemons 170, 176 under load from load generator 112. As shown, the test system 140 is linked to the communication network 130 and includes a communication daemon 160 for managing communication between the load generator 112 and the work daemons 170, 176.

The work daemons 170, 176 are provided to simulate processes of the modeled application or applications and are created or generated by the work daemon generator 180 (or are instantiated without a particular generator 180) based on a work daemon configuration file 192 and one or more machine language source files 196 stored in memory 190, as will be explained in more detail with reference to FIGS. 3-10. The work daemon generator 180 may be run external to the test system 140 before running the actual simulation. Within the test system 140 the communication daemon 160 communicates with the work daemons 170, 176 via internal communication channels 164, e.g., IPC, that can be thought of as a bi-directional, dedicated and private channel or pipeline for sending messages back and forth between the communication and work daemons 160, 170, 176. In another embodiment (not shown), the load generation system 110 components are provided within the test system 140 (i.e., in a non-networked mode). In this embodiment, the load generation clients 114, 116 may communicate with the work daemons 170, 176 via the communication daemon 160 but via Unix Domain UDP or other communication protocols rather than via network UDP/TCP or other network communication protocols.

As is explained in detail with reference to FIGS. 3 and 4, each work daemon 170, 176 includes a static portion 172, 178 and a dynamic portion 173, 179 that work together to simulate processes in an application by modeling the exercising of system memory 150 and executing text segments based on work directives 132 from the load generation clients 114, 116. The static portion 172, 178 defines communication channels 164 for communicating with the communication daemon 160 and provides functionality to exercise system memory 150. The dynamic portion 173, 179 is generated dynamically by the work daemon generator 180 based on the work daemon configuration file (WDCF) 192 to simulate text segment execution portions of a process. The work daemon generator 180 is typically called with a specification of the WDCF 192 and the machine language source file 196 (e.g., source code in Basic Assembly Language format file or another machine-level language).

The WDCF 192 includes one or more records with each record defining a work daemon 170, 176 (i.e., a simulator of a corresponding process of the modeled application). Each WDCF 192 record includes a number of fields that define the work daemons 170, 176. In one embodiment, the fields include an identification string field that provides a name for the work daemon 170, 176, such as an ID that provides a name that links the work daemon 170, 176 to the simulated process of the customer or end user application. Another field provides a unique address in the channels 164 (e.g., an IPC channel) for the work daemon 170, 176. A field is provided to define the number of text functions (e.g., a number greater than zero such as 1000 or the like) that provides a level of granularity which is used to divide up a text segment (e.g., how the simulation process is allowed to jump into and execute a text segment).

Another field in the WDCF record provides the number of machine language source code insertions which defines the number of file insertions into each text function. This is very useful for quickly increasing or ballooning up the size of the work daemon 170, 176 while, significantly, still providing addressable and executable text segments. For example, the number of insertions may be four, which would result in four repetitions of text in the work daemon 170, 176. In other words, during creation of the work daemons 170, 176, source code is generated originally to define the work daemon 170, 176 and then, a padding operation is performed to insert additional segments of source code (such as BAL insertions) such that the work daemon 170, 176 has a size more closely approximating the size of the corresponding process in the modeled application without requiring a human to write lines and lines of code. The padding operation includes finding a landmark or index in the original source code and then inserting the specified number of machine language inserts to create a source code file of augmented machine code with large text segment of self-referencing code. An additional field in the WDCF record is provided to define the size of the data segment.

FIG. 2 provides a simplified embodiment of a state machine simulator system 200 for use in testing a system 240 by simulating a running application with its process placed under a generated load. The system of FIG. 2 is illustrated so as to show three main components of the system 200 and to also show the server/client relationship to better describe communications between the components and to help illustrate a useful start up order for the components. As shown, the load generator client 210 is linked to network 220 and is shown to include or be a network client 216. The test system 240 includes a communication daemon 260 linked to the network 220 and to the IPC 268 and includes a work daemon 270 linked to the IPC. The work daemon 270 is shown to include or be an IPC server 272. In contrast, the communication daemon 260 is shown to be or include a network server 262 and also to be or include an IPC client 266. In practice, the components are initiated or started up in a specific order to establish these various client/server relationships. Specifically, the work daemon or daemons 270 are created and then, the communication daemon 260 is started up. Finally, the load generator client 210 is created and started up to create the work load and communicate work directives over the network 220.

With an understanding of the general architecture of state machine simulator systems 100, 200, the description turns to the methods used to generate the key components of the systems 100, 200 and to their operations to simulate a modeled application and its use in a machine under load. FIGS. 3 and 4 illustrate the operating of a previously built work daemon(s), and the generation of a work daemon(s) having static and dynamic portions, respectively. In other words, the work daemon generator may be thought of having two phases: construction of the daemon (static) as shown in FIG. 4 and usage (dynamic) as shown in FIG. 3. The work daemon generator (such as generator 180 of FIG. 1) is typically a straight through flow process (i.e., is not multi-threaded). Work daemons are modeled after real processes in a modeled application and receive work directive messages from one or more load generators. A command is generated to build work daemons based on a number of WDCF records. An IPC rendezvous file or point (not shown in FIG. 1) is provided to define the internal communication channels or dedicated private channels that will be used for communications between the communication daemon and the work daemons.

Figure 3:
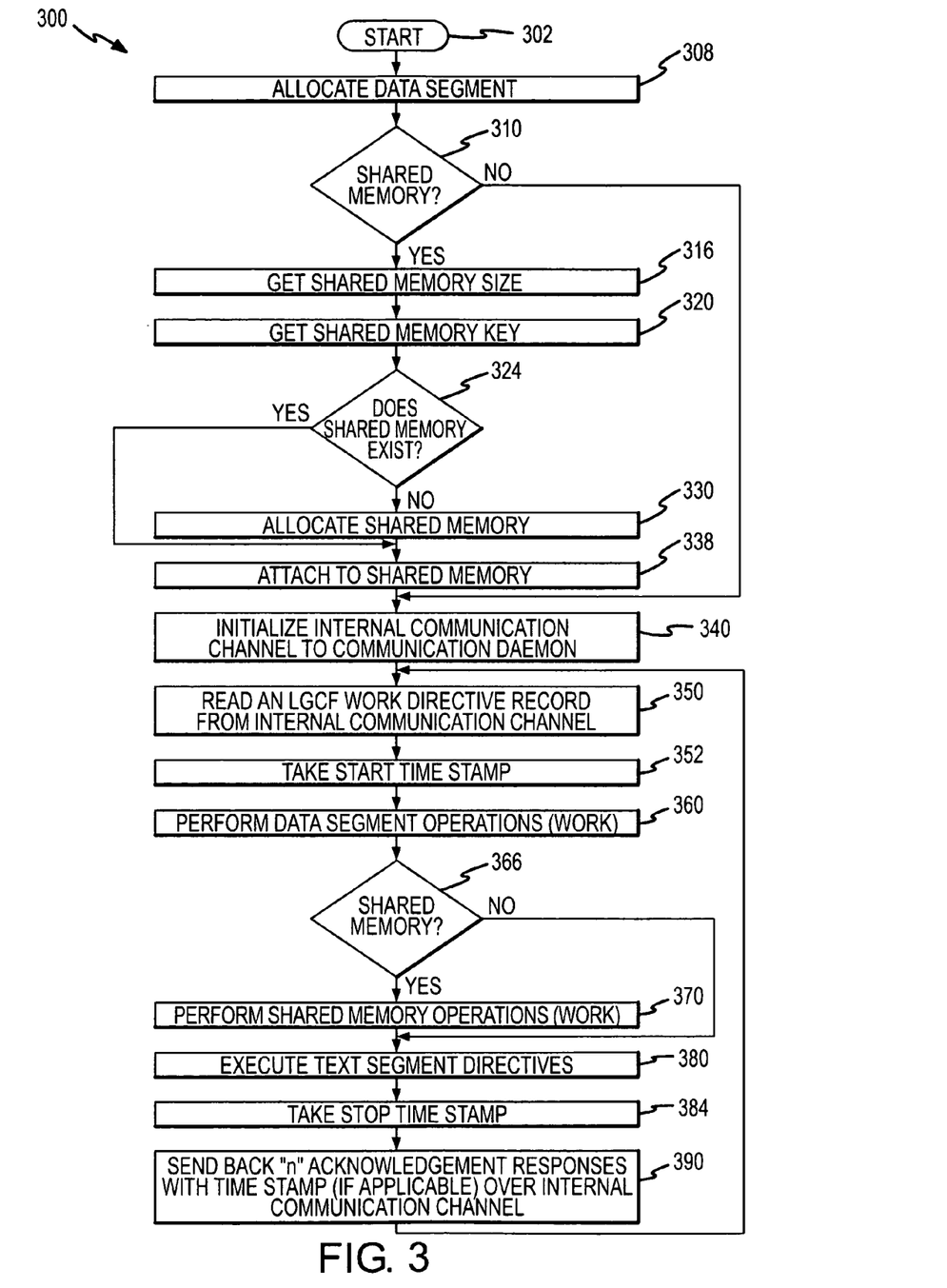
FIG. 3 illustrates how the static portion of a work daemon functions when LGCF messages arrive as the simulation is executed.

FIG. 3 illustrates a static or main method 300 that is performed for each built work daemon. This static process 300 operates to simulate a state machine. The method 300 starts at 302 such as with a call from the work daemon generator with a set of arguments such as data segment specification, shared memory specification, and the like. At 308, a specified data segment is allocated. Next, any desired shared memory is set up. To this end, the method 300 continues at 310 with a determination if there is shared memory and if so, the method 300 continues at 316 by getting the shared memory size and at 320 with getting the shared memory key. At 324, the method 300 continues with determining if shared memory exists, such as from a previous instantiation, and if not allocating at 330 the shared memory in the test system. At 338, the method 300 continues with attaching the work daemon to the allocated shared memory. At 340, the work daemon generation method 300 continues with initializing of the internal communication channel from the selected work daemon to the communication daemon (e.g., initializing the IPC).

At 350, the work daemon begins to perform work by reading an LGCF work directive record from the internal communication channel (e.g., a work directive from a load generation client). To facilitate time stamp analyses, a start time stamp is taken at 352. Then, the method 300 continues with operating the work daemon to perform the data segment operations or work on test system memory as specified in the work directives. At 366, the work daemon determines if there is shared memory attached to the work daemon and if so, the method 300 continues with the work daemon performing the shared memory operations or work defined in the received work directives. At 380, the work daemon executes the text segment directives which may include jumping to a place in the text segment based on the text segment index in the directive and executing the number of text segment sequentially from this indexed point as specified by the work directive. At 384, a stop time stamp is taken. Then, if applicable, the method 300 further includes at 390 operating the work daemon to send back "n" (i.e., a number specified in the LGCF record) acknowledgment responses to the source of the work directive with the time stamp(s) over the internal communication channel. The method 300 then continues by waiting for, reading, and processing any additional LGCF work directive records.

As discussed previously, additional functionality may be provided in the static or dynamic portions of the work daemons 170, 176 to exercise differing portions of the test system 140. For example, the method 300 of FIG. 3 may be supplemented with functional steps to produce a desired amount of disk activity in test system 140. In one such embodiment, a step is added between steps 308 and 310 that includes opening a disk file (such as a disk drive configuration file or DDCF) that contains file system path names. All files specified for I/O may be opened, and then as part of this additional step, each file descriptor is saved into a file descriptor array. After this initial disk activity step, another step may be added to the method 300, such as between steps 352 and 360, to perform disk operations on the specified file descriptor via an index into the file descriptor array. This disk activity generation step may include seeking, reading, and writing disk files or volumes in the test system 140.

Figure 4:
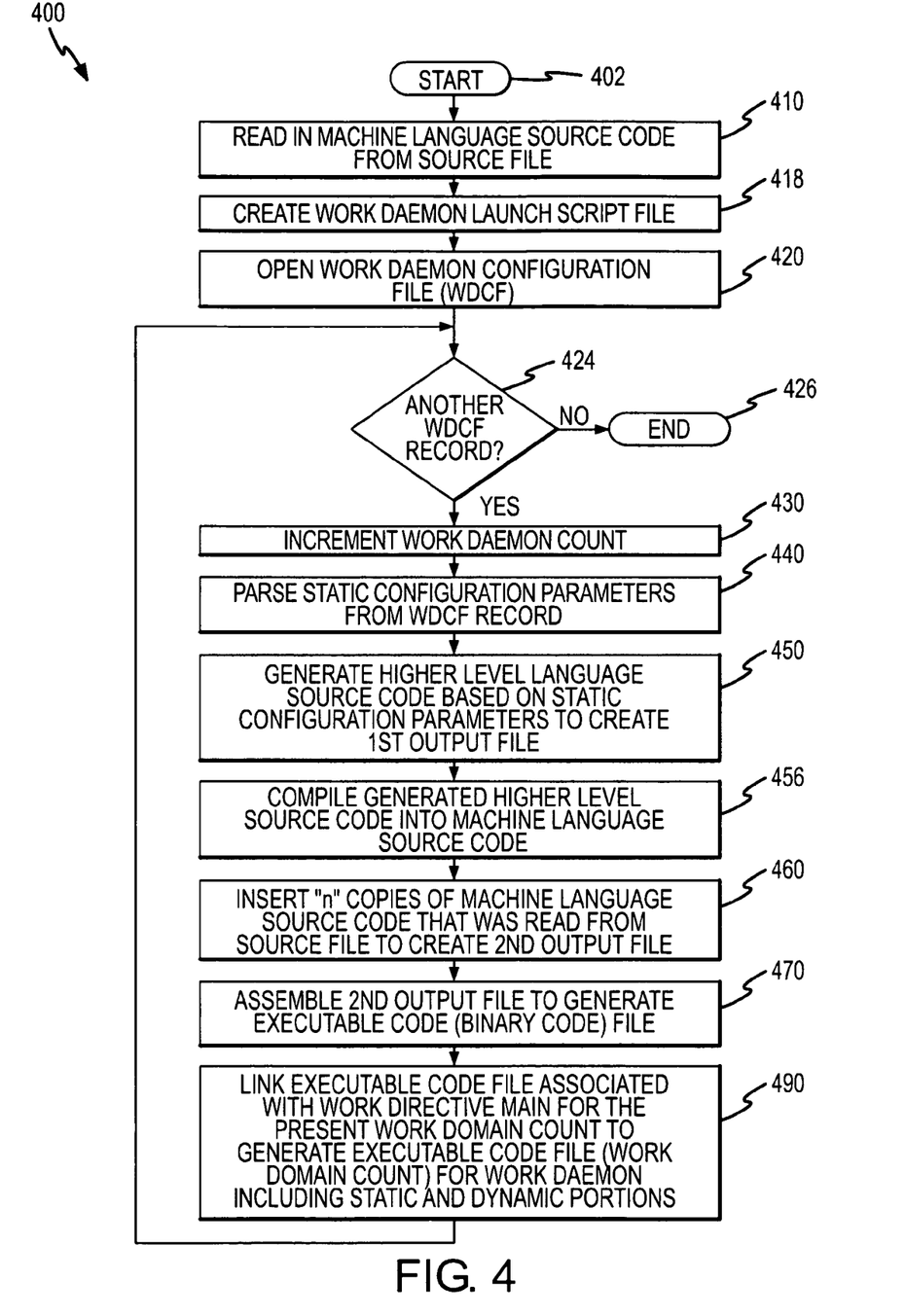
FIG. 4 illustrates how the dynamic portion of a work daemon is configured prior to simulation run time.

Prior to its use, the work daemon is created or built according to method 400 shown in FIG. 4, which is used to create a static portion based on a static parameter that dictates how the work daemon communicates with the communication daemon and how it exercises test system memory and the text segments, e.g., the arbitrarily sized text segment or execution portion of the work daemon.

As shown, the method 400 begins at 402 and at 410, the work daemon generator acts to read in the machine language source code from a source file (such as file 196 in FIG. 1). At 418, the work daemon generator creates a work daemon launch script file (not shown in FIG. 1) and then, at 420, opens a work daemon configuration file (WDCF), such as WDCF 192 of FIG. 1. At 424, the method 400 includes determining if there are additional WDCF records that would require generating additional work daemons. If not, the method 400 ends at 426.

If additional records defining additional work daemons are found, the method 400 continues at 430 with incrementing a work daemon count and then at 440 with parsing the static configuration parameters from the WDCF record. At 450, a higher level language, such as C programming language, source code is generated based on the parsed static configuration parameter for the present work daemon, and this step 450 produces a first output file. At 456, the higher level source code or first output file is compiled into machine language source code (e.g., a first BAL source code file). Next, at 460, the method 400 continues with the work daemon generator inserting "n" copies of machine source code as read from the source file to create a second output file (or augmented file). Next, at 470, the second output file is assembled to generate an executable code (or binary code) file. The executable code file of the completed work daemon is then linked to the main framework of the work daemon generator as shown in FIG. 3 (such as with an invocation command being written to the start up or work daemon launch script file) and the resulting file is identified with the process name from the WDCF record as a component of its file name.

Figure 5:
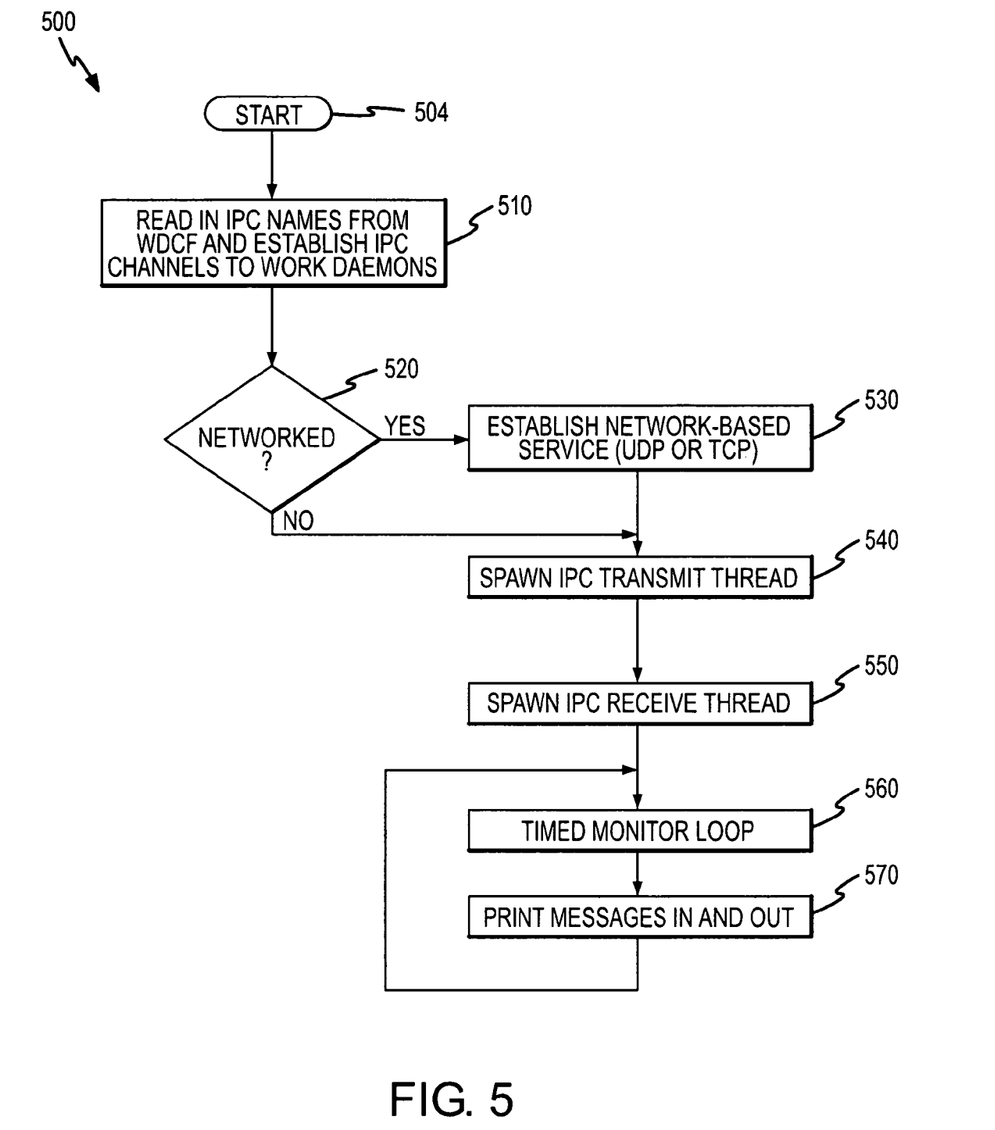
FIG. 5 illustrates steps involved in the operation of a communication daemon, such as the communication daemon of FIG. 1 or FIG. 2, for handling transmissions between work generator clients and work daemons of the state machine simulator system.

FIG. 5 illustrates a method 500 for initiating and running the communication daemon which starts at 504. At 510, the communication daemon reads in IPC or internal communication channel names from the WDCF and establishes the IPC channels to the work daemons previously built (as discussed with reference to FIGS. 3 and 4). At 520, the method 500 continues with determining if the state machine simulator system is networked or non-networked. If networked, at 530, the communication daemon acts to establish a network-based service (e.g., UDP, TCP, or the like). At 540, the method 500 continues with spawning an IPC transmit thread and at 550 with spawning an IPC receive thread. The communication daemon operates in a multi-threaded environment with the main thread shown in FIG. 5 and the transmit thread and receive thread shown in FIGS. 6 and 7 running concurrently. A timed (such as 10 seconds or the like) monitor loop is repeated as steps 560 and 570, which includes printing counts for messages in and out. In practice, the communication daemon acts as a shipping terminal that de-multiplexes messages from the load generator to the work daemons and multiplexes messages from the work daemons to the load generator. The messages from the load generation clients are routed to the work daemons as specified in the particular work directive message.

Figure 6:
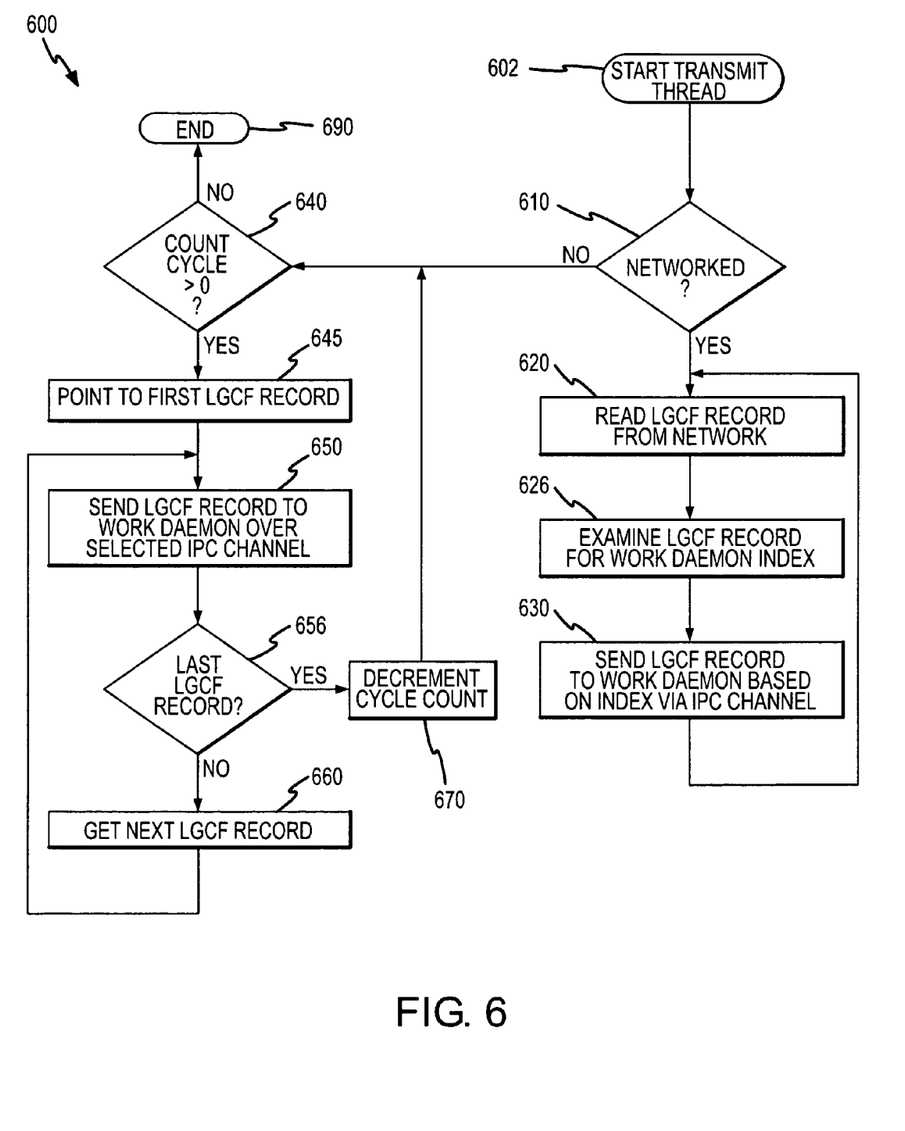
FIG. 6 shows a method for starting an IPC transmit thread as spawned or started from the method of FIG. 5.

FIG. 6 illustrates the IPC transmit thread 600 of the communication daemon which is spawned at 540 of the method 500 of FIG. 5 to begin at 602. At 610, the thread or method 600 continues with determining whether the communication daemon is networked or linked to an external communications network. If yes, at 620, the communication daemon reads an LGCF record from the network. Examines the LGCF record at 626 to identify the specified work daemon index. Based on the index, the communication daemon acts at 630 to send the LGCF record or work directive message to the appropriate work daemon via the IPC channel. If not networked, the method 600 continues at 640 with a determination if the count cycle value is greater than zero, and if not, the method 600 is ended at 690. If greater than zero, the method continues at 645 with pointing to the first LGCF record and then, at 650 with the communication daemon operating to send the LGCF record to the work daemon over the selected IPC channel. At 656, the communication daemon determines if there are additional LGCF records, and if yes, the method 600 continues at 660 with getting the next LGCF record and repeating step 650. If not, the method 600 continues with decrementing the cycle count at 670 and then repeating step 640.

Figure 7:
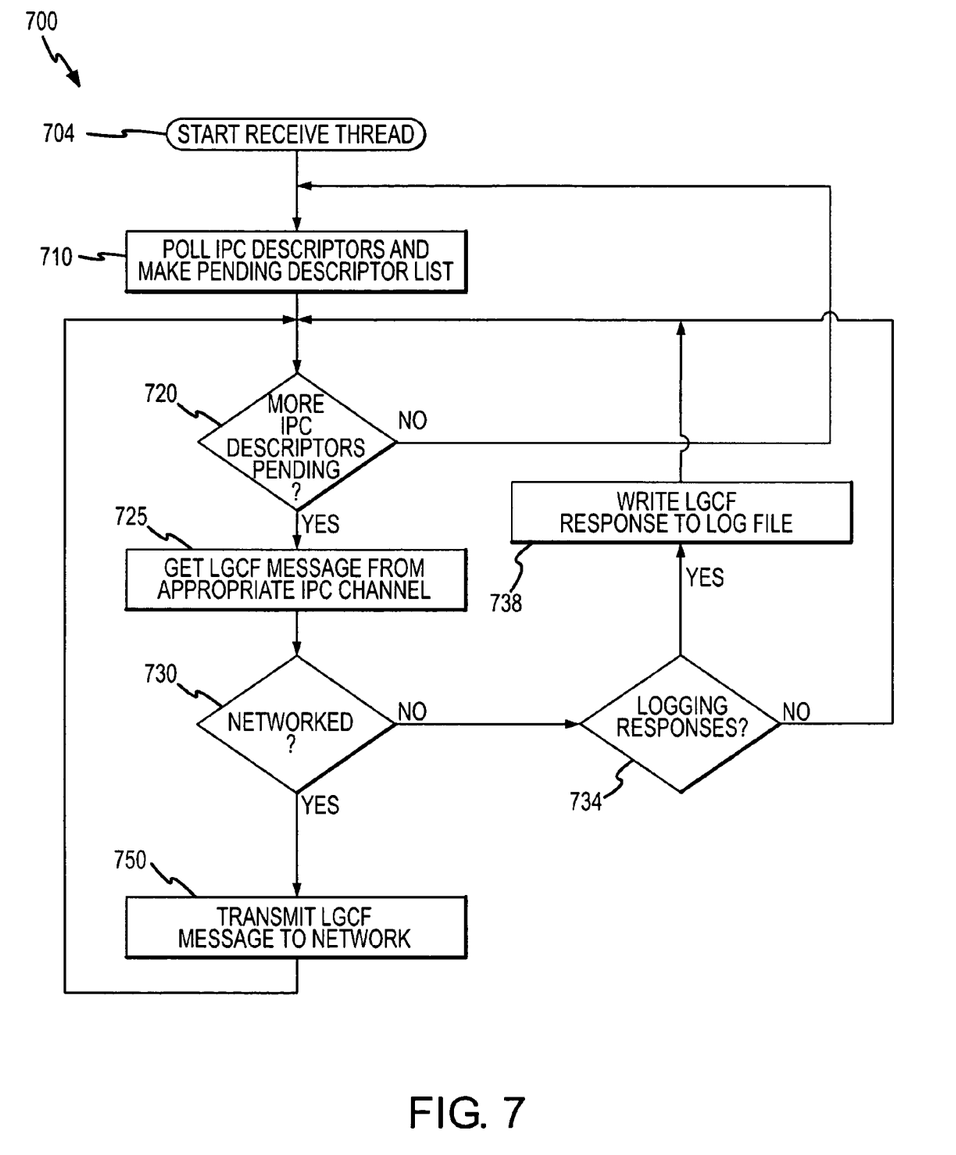
FIG. 7 shows a method for starting an IPC receive thread as spawned or started from the method of FIG. 5.

FIG. 7 illustrates the IPC receive thread 700 of the communication daemon spawned or started at 550 of the communication daemon method 500 of FIG. 5. The method 700 starts at 704 and continues at 710 with the communication daemon polling the IPC descriptors and making a pending descriptor list. At 720, a determination is made as to whether there are more IPC descriptors pending (e.g., are there channels open to work daemons from which a receipt may be received). If not the method 700 continues with performing the polling step at 710. If there are IPC descriptors pending, the next LGCF message is obtained from the appropriate IPC channel at 725. Then, the communication daemon determines whether it is networked at 730, and if yes, the communication daemon at 750 transmits the LGCF message to the network and intended load generation client, with the method 700 continuing at 720 by looking form more IPC descriptors that may be pending. If the communication daemon in not networked, the communication daemon may act at 734 to determine if response logging is activated and if so, writing LGCF responses to a log file and then looking for more pending IPC descriptors.

Figure 8:
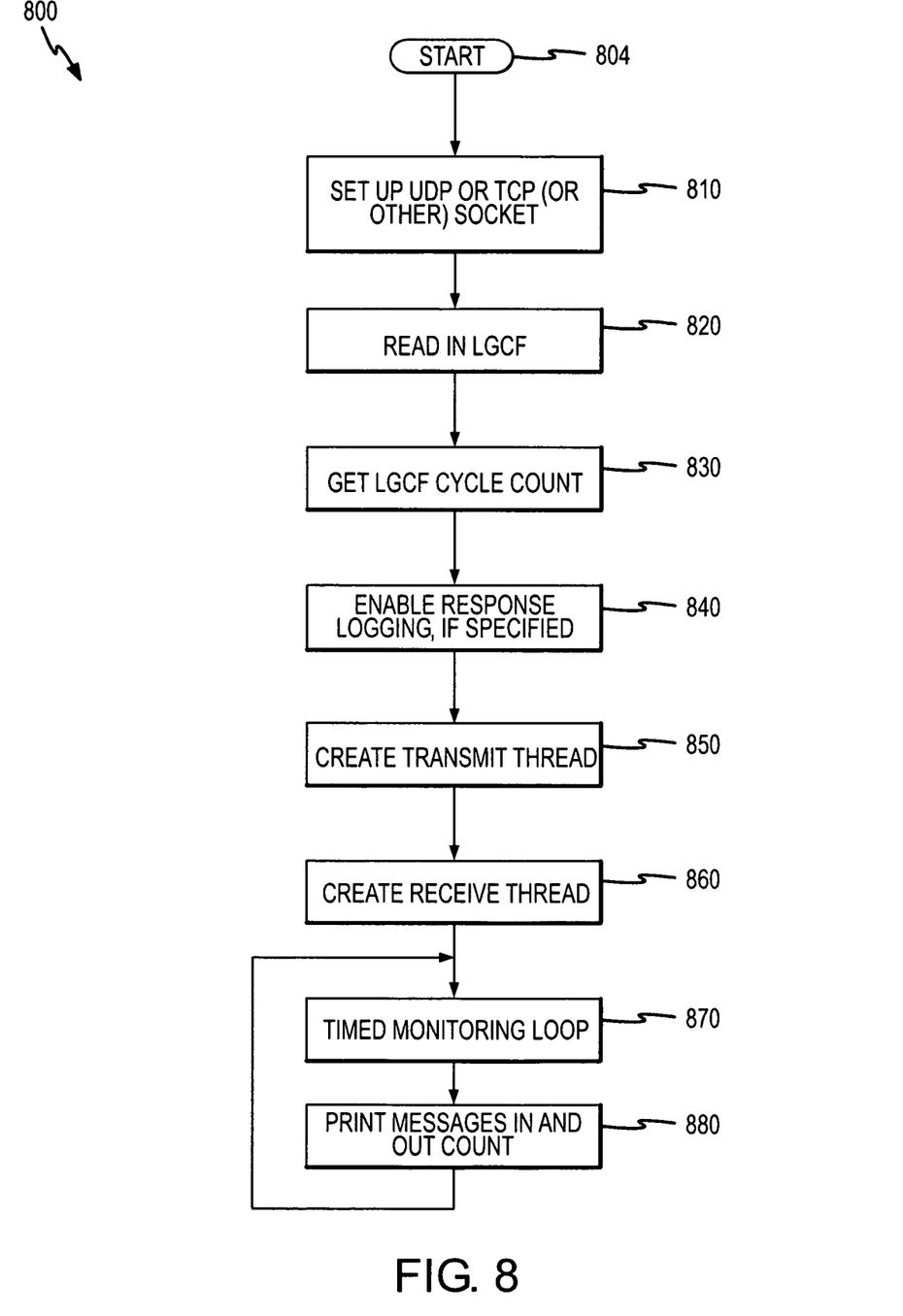
FIGS. 8-10 illustrate three threads or processes that run concurrently, e.g., multithreading, to create and run the load generator clients of the present invention, i.e., a main load generator client thread, a transmit thread, and a receive thread.
Figure 9:
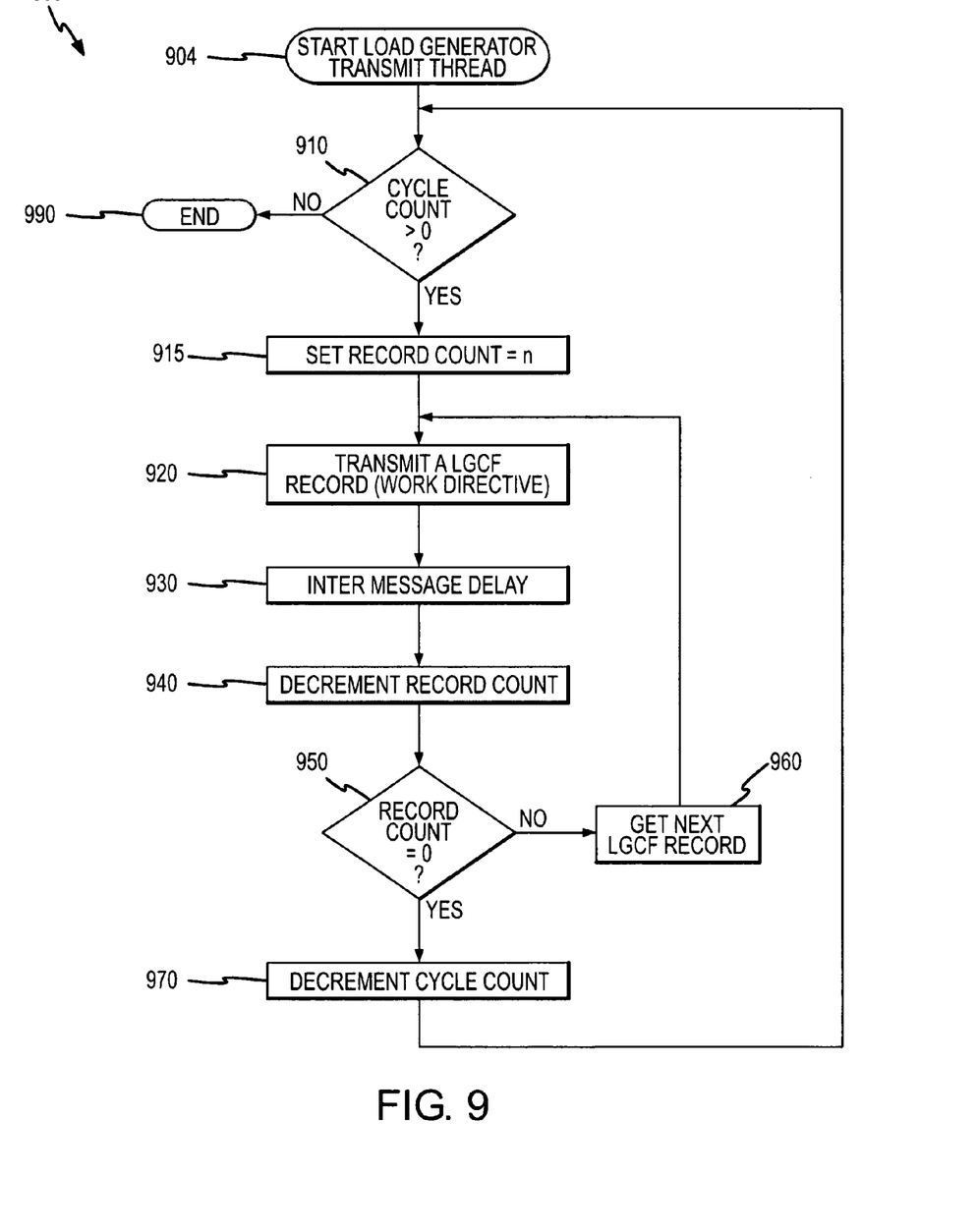
Figure 10:
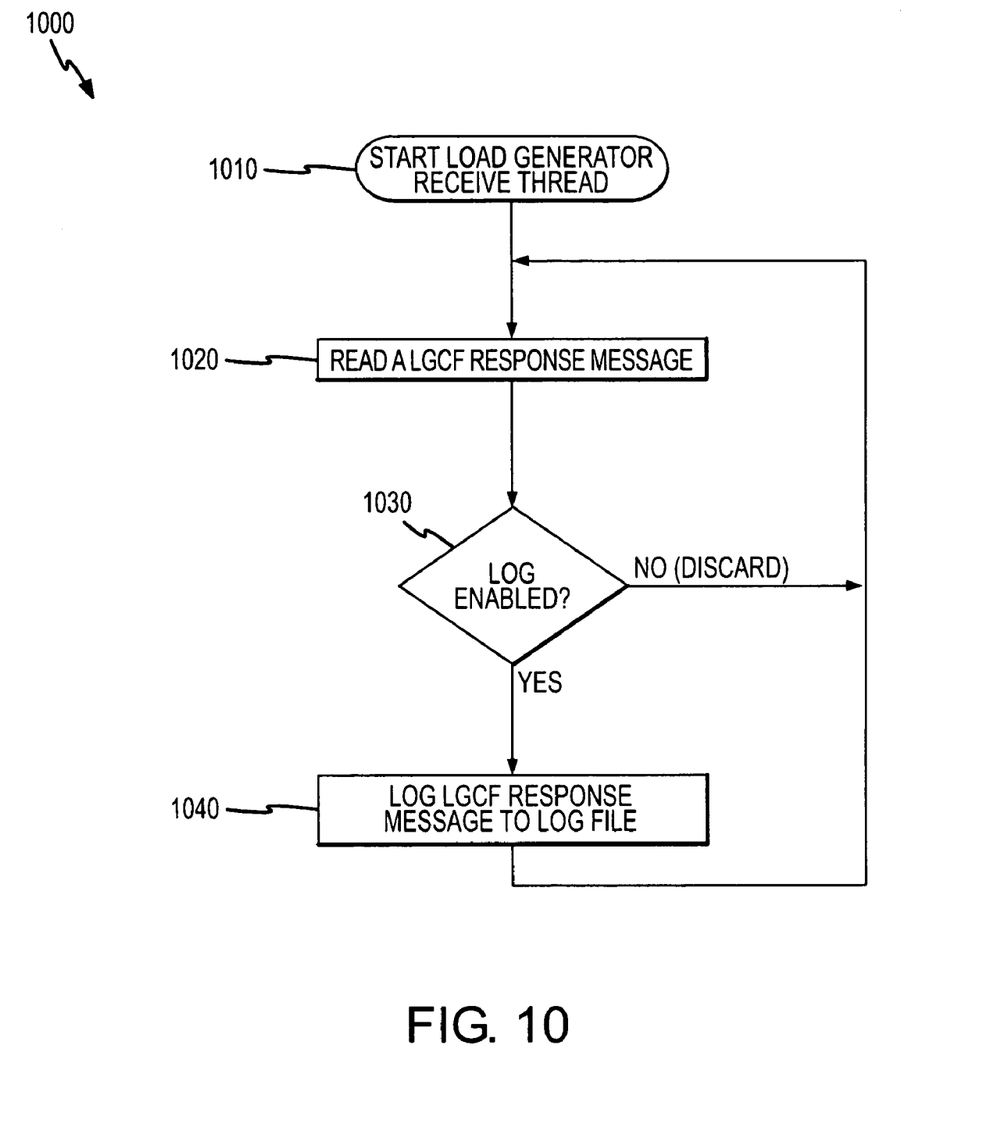

As discussed with reference to FIG. 1, the state machine simulator systems of the invention include dynamic load generation that is delivered to the work daemons. In a typical embodiment of the invention, the load generation processes are provided as a suite of processes or threads that are run concurrently by the load generator. As discussed with reference to FIG. 2, the load generator client or clients are brought up or initiated after the test system with its work daemons and communication daemon have been brought up and are running, e.g., waiting to receive load generation or work directive messages. One or as many load generator clients may be started by the load generator to simulate a particular load on a test system. FIGS. 8-10 illustrate each of these threads that are run by each load generation client and which may be labeled a main load generation client thread 800, a transmit thread 900, and a receive loop or thread 1000.

As shown in FIG. 8, the main thread 800 begins at 804 and continues at 810 with setting up a communication socket, such as a UDP or TCP socket and then reading in the LGCF at 820. At 830, the load generation client act to get the LGCF cycle count and to enable response logging if specified in the LGCF. At 850, the load generation client creates a transmit thread and at 860 creates a receive thread. Then, at 870 and 880, a timed (such as 10 seconds or the like) monitory loop is repeated to continue the main thread of the load generation client and including printing a message in and out count.

FIG. 9 illustrates a load generation client transmit thread 900 such as is started at 850 in the main thread 800 of FIG. 8. The method 900 starts at 904 and continues with determining at 910 if the cycle count is greater than zero and if not, ending the thread 900 at 990. If cycle count is greater than zero, the method 900 continues at 915 with setting the record count to "n". The method 900 continues at 920 with the load generation client transmitting the LGCF record or work directive to a particular work daemon via the communication daemon. At 930, the transmit thread 900 includes an intermessage delay to model non-continuous behavior (e.g., a microsecond sleep is provided) and provides a delay between transmittal of LGCF records. At 940, the work generation client decrements the record count and at 950, determines whether the record count is zero or not. If not, the next LGCF record is retrieved at 960 and the method 900 continues at 920. If zero, the work generation client acts at 970 to decrement the cycle count and then to continue the method 900 at step 910.

FIG. 10 illustrates a load generation client receive thread 1000 such as is started at 860 in the main thread 800 of FIG. 8. At 1010, the thread is started and at 1020 the load generation client reads a response message from the communication daemon. At 1030, the load generation client determines if logging is enabled and if not, the message is discarded or not saved and the method 1000 continues at 1020 with reading the next response message. At 1040, if logging is enabled, the load generation client acts to log the response message in the log file for later analysis (e.g., analysis of the time stamp and/or other information in the response).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. In a telephony implementation, the concepts of the invention were implemented with a state machine simulator system having 97 work daemons emulating 97 processes in a modeled application. The work daemon processes were configured to include additional functionality to better model a particular application, and particularly, was configured to include code for simulating cache manipulations. This is useful for explicitly showing that additional functionality may be provided in the work daemons to practice the invention and model specific applications and their processes. In this telephony implementation, the per process loading for the work daemons (e.g., how many load directives and how much work to perform) was determined by examining processing characteristics of the modeled application including accumulated CPU time statistics (such as may be obtained from an end user, customer, or the like running the modeled application or as gathered from a lab setting as recorded by an operating system when running the modeled application), and process size information.

I claim:

1. A method for simulating running a software application on a test computer or system, comprising:

providing a plurality of work daemons on the computer system, the work daemons being provided in a quantity substantially similar to a number of processes in the software application;

configuring each of the work daemons with a static portion performing functions on memory of the test system when the work daemon is run on the test system;

configuring each of the work daemons with a dynamic portion comprising a text segment that is selectively executable when the work daemon is run on the test system, wherein the static portion and the dynamic portion are adapted to simulate similar operations performed by a corresponding one of the actual software application processes; and running at least a portion of the configured work daemons on the test system.

2. The method of claim 1, wherein the configuring of each of the work daemons with a static portion comprises parsing static configuration parameters from a record in a work daemon configuration file and generating a machine language source code file based on the parsed parameters.

3. The method of claim 2, wherein the configuring of each of the work daemons with a dynamic portion comprises reading an insertion set of machine language code from a source file, retrieving an insertion value, and inserting a number of copies of the read insertion set of machine language code into the previously generated machine language source code file, the number of copies being equal to the retrieved insertion value.

4. The method of claim 3, wherein the configuring of each of the work daemons with a dynamic portion further comprises retrieving an insertion index and the inserting of the number of copies comprises locating the insertion index in the previously generated machine language source code file and performing the inserting at the located insertion index, whereby a selectable number and addressable set of text segments are added to the work daemons.

5. The method of claim 1, further comprising with the at least a portion of the configured work daemons receiving a work directive from a plurality of work generation clients and in response, performing the running based on parameters in the received work directive.

6. The method of claim 5, wherein the work directive comprises a set of data segment directives executed by the static portion of the work daemons and a set of text segment directives performed by the dynamic portion of the work daemons.

7. The method of claim 6, wherein the data segment directives cause the static portion of the work daemons to manipulate at least one of cache, stack, heap, or shared memory in the test system memory.

8. The method of claim 6, further comprising operating the work generation clients to each read a load generator configuration file, to transmit each record in the read load generator configuration file to a specified one of the work daemons by way of a communication daemon, and when specified, to log a response from the work daemons that have processed the transmitted records.

9. The method of claim 8, wherein the records include a cycle count defining a number of copies of the work directive records to transmit to the work daemons.

10. The method of claim 5, further comprising providing a communication daemon in the test system between the work generation clients and the work daemons, the communication daemon receiving the work directive records, processing each of the work directive records to identify an addressed one of the work daemons, and transmitting the work directive records over internal communication channels of the test system to the addressed ones of the work daemons.

11. A computer system adapted for simulating operating conditions during execution of a modeled application having a number of processes under selected loads, comprising:

a communications network;

a load generator client linked to the communications network, the load generator client generating load generation messages and transmitting the load generation message over the communications network;

a test system linked to the communication network comprising a communications daemon receiving the load generation messages and routing the load generation messages over internal communication channels specified in the load generation messages, the test system further comprising a number of work daemons receiving the load generation messages and in response, exercising memory of the test system based on data segment directives included in the load generation messages and executing a number of text segments contained in the work daemons based on text segment directives in the load generation messages, wherein the number of work daemons is substantially equal to the number of processes of the modeled application.

12. The system of claim 11, further comprising a work daemon generator performing a set of steps to generate the work daemons comprising:

configuring each of the work daemons with a static portion performing functions on the memory of the test system when the work daemon is run on the test system;

configuring each of the work daemons with a dynamic portion comprising the text segments that are selectively executable when the work daemon is run on the test system, wherein the static portion and the dynamic portion are adapted to simulate similar operations performed by a corresponding one of the modeled application processes.

13. The system of claim 12, wherein the configuring of each of the work daemons with a static portion comprises parsing static configuration parameters from a record in a work daemon configuration file and generating a machine language source code file based on the parsed parameters.

14. The system of claim 13, wherein the configuring of each of the work daemons with a dynamic portion comprises reading an insertion set of machine language code from a source file, retrieving an insertion value, and inserting a number of copies of the read insertion set of machine language code into the previously generated machine language source code file, the number of copies being equal to the retrieved insertion value.

15. The system of claim 14, wherein the configuring of each of the work daemons with a dynamic portion further comprises retrieving an insertion index and the inserting of the number of copies comprises locating the insertion index in the previously generated machine language source code file and performing the inserting at the located insertion index, whereby a selectable number and addressable set of text segments are added to the work daemons.

16. A method for testing a computer system under load conditions, comprising:

provi ding a plurality of work daemons on the computer system;

configuring each of the work daemons with a static portion performing functions on memory of the test system when the work daemon is run on the test system;

configuring each of the work daemons with a dynamic portion with selectively executable text segment, wherein the configuring of each of the work daemons with a dynamic portion comprises reading machine language code from a source file, retrieving an insertion value, and inserting a number of copies of the read machine language code into a work daemon file with code representing the static portion, the number of copies being equal to the retrieved insertion value; and running at least a portion of the configured work daemons on the test system.

17. The method of claim 16, wherein the configuring of each of the work daemons with a static portion comprises parsing static configuration parameters from a record in a work daemon configuration file and generating a machine language source code file based on the parsed parameters.

18. The method of claim 17, wherein the configuring of each of the work daemons with a dynamic portion further comprises retrieving an insertion index and the inserting of the number of copies comprises locating the insertion index in the work daemon file and performing the inserting at the located insertion index, whereby a selectable number and addressable set of text segments are added to the work daemon file.

19. The method of claim 16, further comprising with the at least a portion of the configured work daemons receiving a work directive from a plurality of work generation clients and in response, performing the running based on parameters in the received work directive, wherein the work directive comprises a set of data segment directives executed by the static portion of the work daemons and a set of text segment directives performed by the dynamic portion of the work daemons.

20. The method of claim 19, further comprising operating the work generation clients to each read a load generator configuration file, to transmit each record in the read load generator configuration file to a specified one of the work daemons, and to log when specified a response from the work daemons that process the transmitted records, wherein the transmitting of the records is performed a number of times equal to a cycle count.

* * * * *